(12) United States Patent
Barbe

(10) Patent No.: US 7,354,512 B1
(45) Date of Patent: Apr. 8, 2008

(54) POOL FILTER BACKFLUSH TRAP

(76) Inventor: Andre Christian Barbe, 13640 Sycamore Dr., Morgan Hill, CA (US) 95037

( * ) Notice: Subject to any disclaimer, the term of this patent is extended or adjusted under 35 U.S.C. 154(b) by 136 days.

(21) Appl. No.: 11/105,658

(22) Filed: Apr. 15, 2005

(51) Int. Cl.
*B01D 29/23* (2006.01)
*B01D 29/27* (2006.01)

(52) U.S. Cl. ............ 210/167.1; 210/232; 210/167.14; 210/416.2; 210/449; 210/460

(58) Field of Classification Search ............ 210/167.1, 210/232, 167.13, 167.14, 416.1, 448, 416.2, 210/449, 460
See application file for complete search history.

(56) References Cited

U.S. PATENT DOCUMENTS

| | | | |
|---|---|---|---|
| 2,985,307 A | * | 5/1961 | Grasmere et al. ...... 210/167.11 |
| 5,505,844 A | * | 4/1996 | Porter .......................... 210/95 |
| 6,210,573 B1 | * | 4/2001 | Marshall ...................... 210/238 |
| 6,896,798 B2 | * | 5/2005 | Dover et al. ........... 210/170.02 |
| 2004/0104163 A1 | * | 6/2004 | Leaverton ................... 210/448 |

FOREIGN PATENT DOCUMENTS

| EP | 0402243 | * | 12/1990 |
|---|---|---|---|
| JP | 11-147008 | * | 6/1990 |

* cited by examiner

*Primary Examiner*—Fred G. Prince

(57) ABSTRACT

A pool filter backflush trap comprising a filter member having an opening for receiving water and contaminants from a backflush discharge tube. The filter member forming an enclosure about the backflush discharge tube and having a surface area of sufficient size to allow water to pass through the filter member at a flow rate at least equal to the flow rate of the water entering the opening of the filter member. After backflushing, the trap can be disposed of appropriately in a waste receptacle thereby preventing diatomaceous earth and contaminants from being dispensed in the environment.

12 Claims, 5 Drawing Sheets

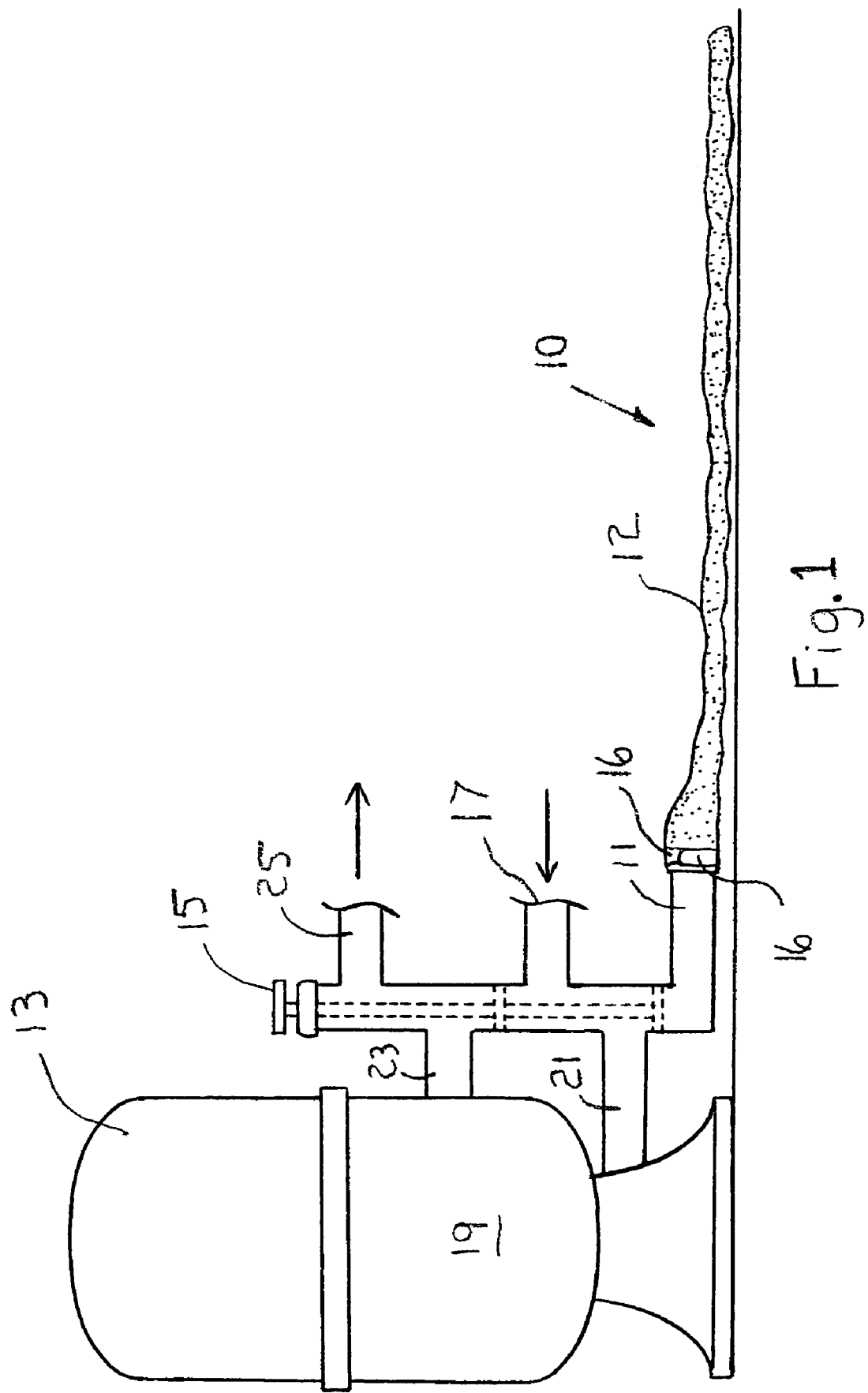

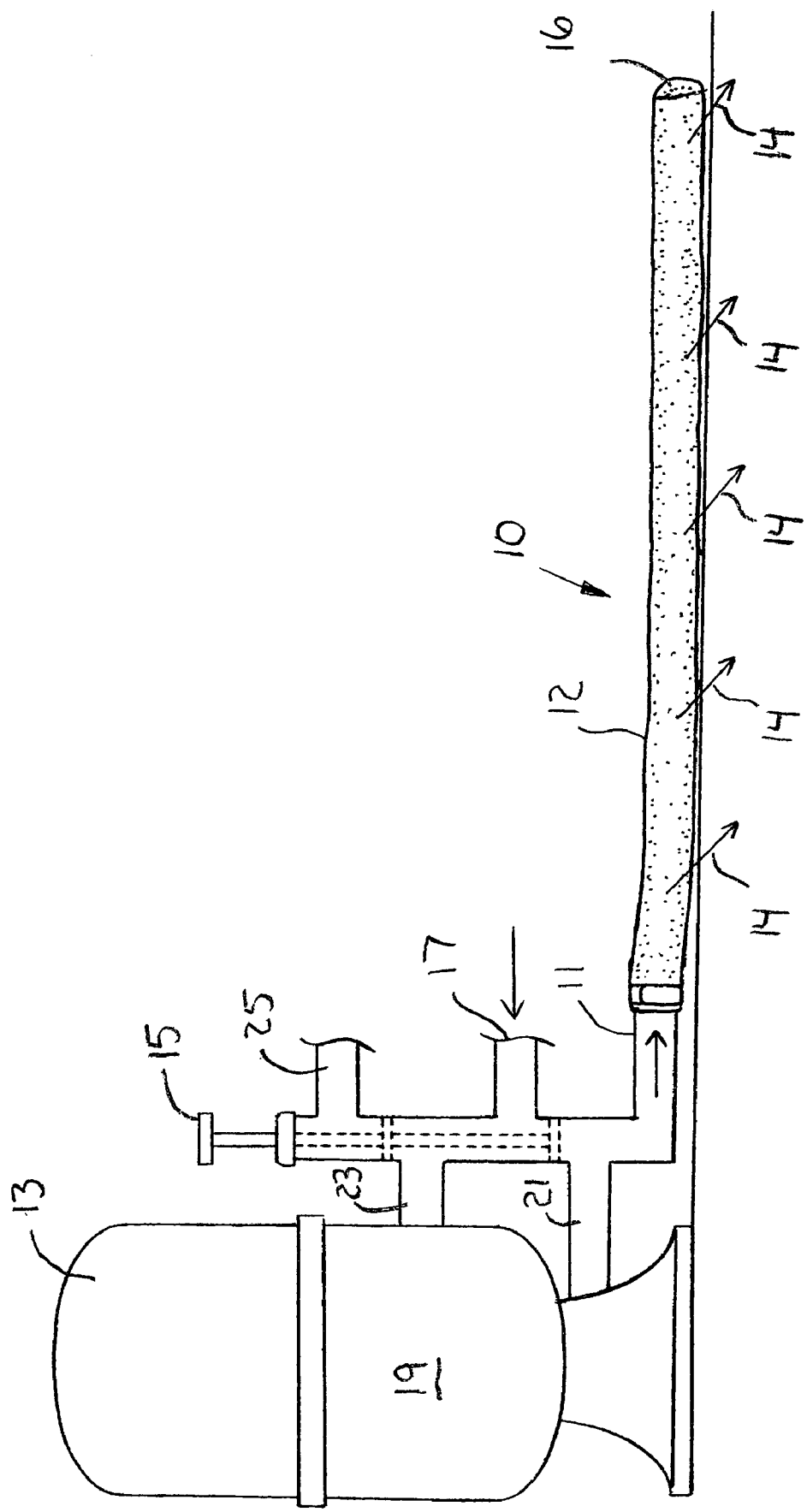

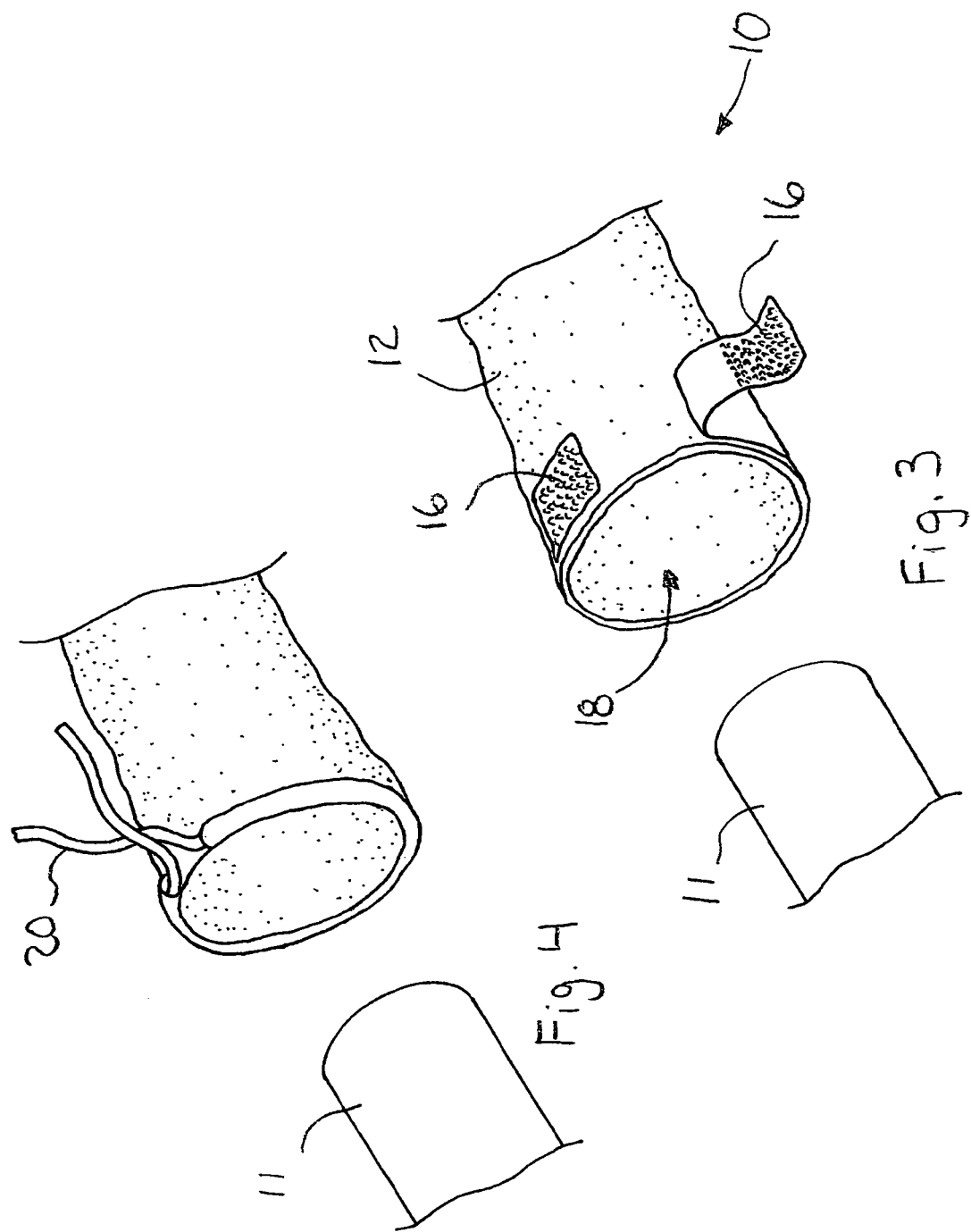

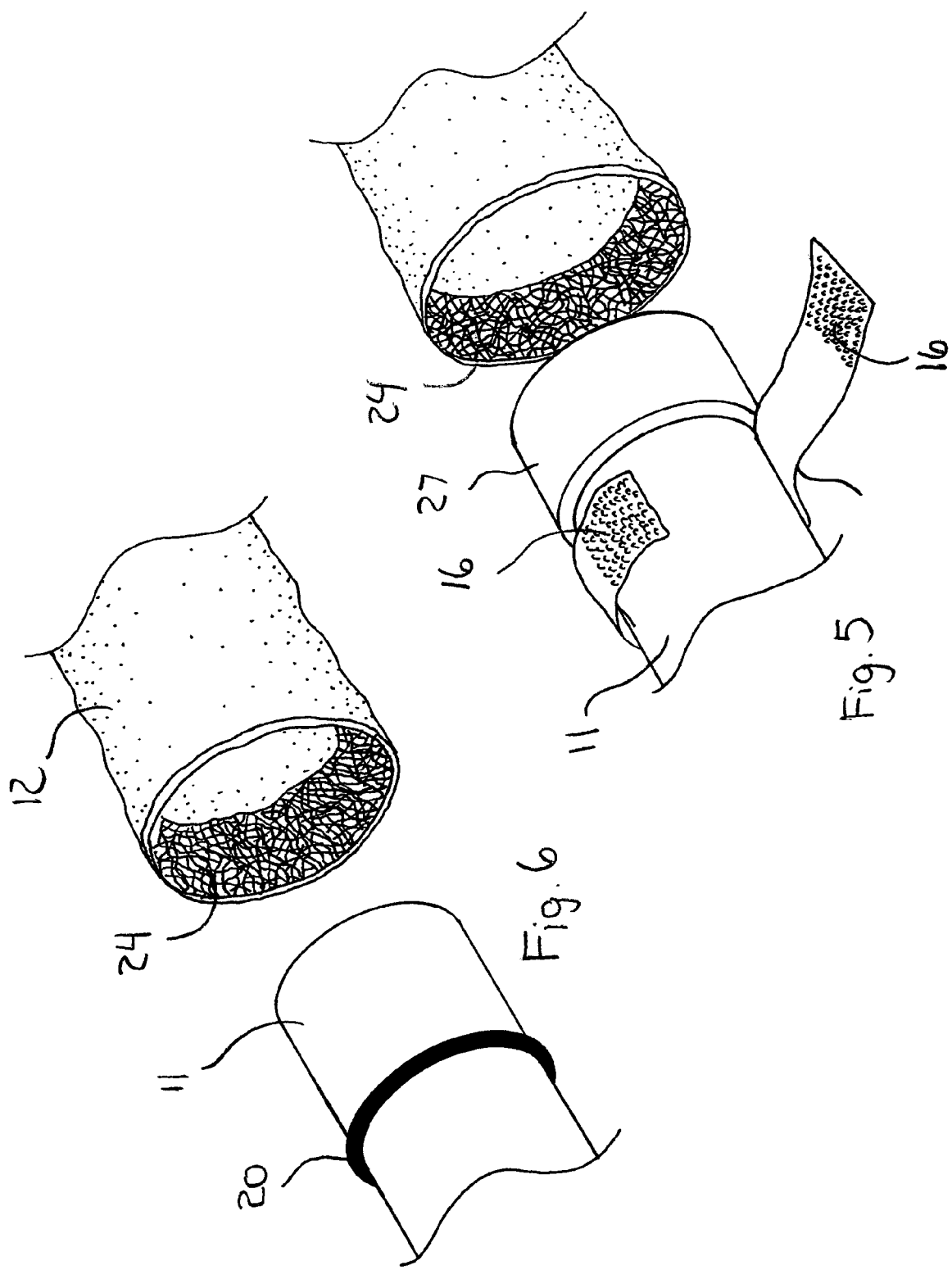

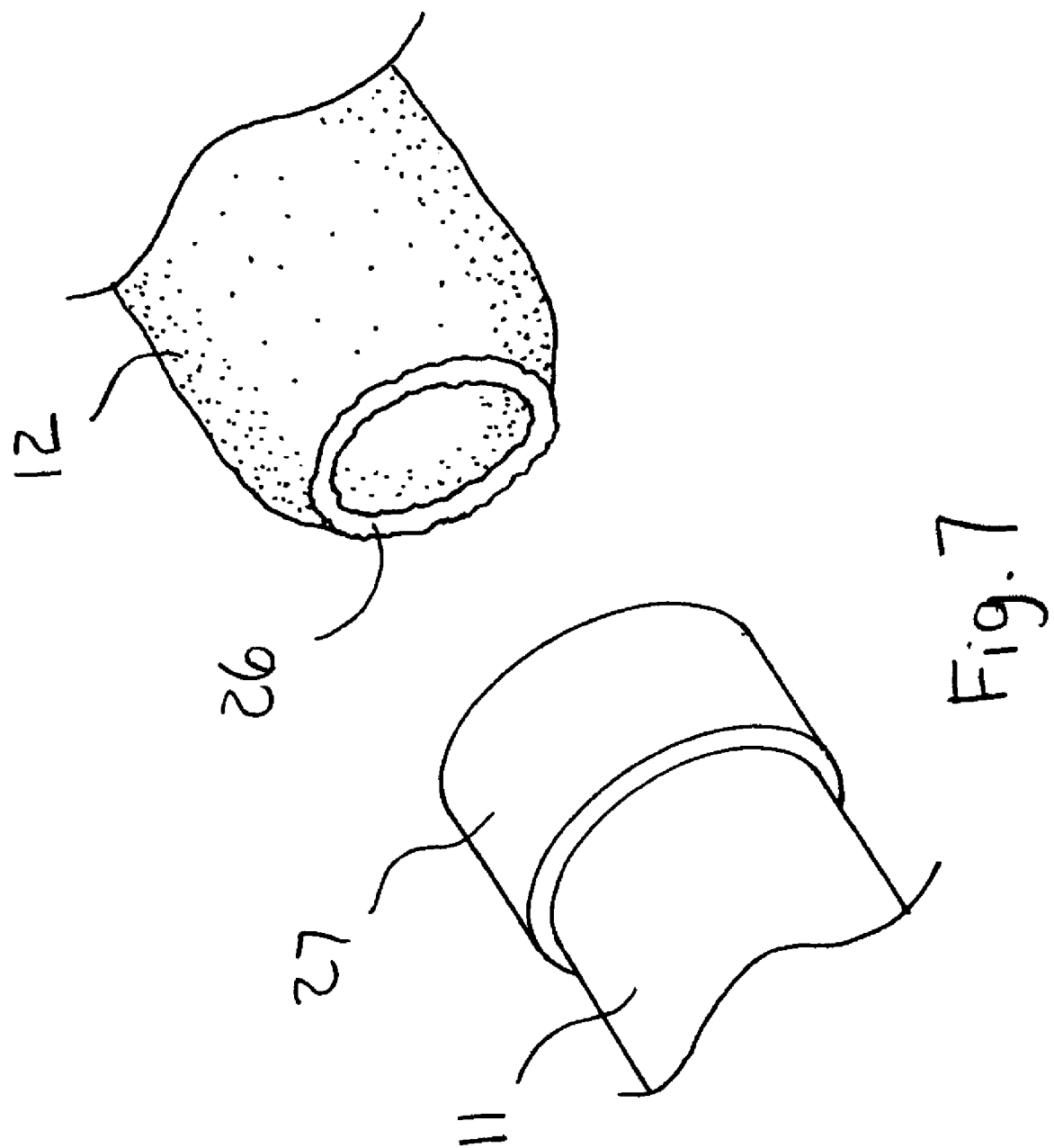

POOL FILTER BACKFLUSH TRAP

FIELD OF THE INVENTION

This invention relates specifically to a pool filter backflush trap device that connects to the backflush discharge tube of a diatomaceous earth pool filter and captures contaminants and diatomaceous earth discharged when backflushing the filter to prevent diatomaceous earth from being dispursed into the environment.

BACKGROUND OF THE INVENTION

Diatomaceous earth pool filters (DE pool filters) are commonly found in most residential pool circulation systems. DE filters require diatomaceous earth be introduced into the inlet skimmer port of the pool when the pool motor is on in order to coat the surface of the filter. Diatomaceous earth is a heavy, dense, fine white powder which, when expelled in water, leaves a white residue around the area where the water is expelled. In addition, diatomaceous earth clings to drainage systems and over time can clog these systems. Recently, many counties in the state of California and in other states have passed ordinances making it illegal to flush diatomaceous earth into street sewer systems. These ordinances often provide fines for each instance such dumping is cited.

A significant number of diatomaceous earth pool filters feature a backflush system. When the backflush valve is open, the backflush system reverses the flow of water through the filter, which dislodges contaminants that have accumulated on the filter. The backflushed water is expelled through a discharge tube typically located at ground level so that the contaminants do not go back in the pool. Unfortunately, diatomaceous earth and contaminants are dispersed into nearby landscaping, drainage systems, and sewer systems. Presently, many pool owners, when backflushing their filters, are likely discharging diatomaceous earth into sewer systems in violation of city ordinances. This situation is even more troublesome for pool service companies that backflush numerous pool filters a day, as most diatomaceous earth dumping ordinances provide fines for each instance of dumping. Thus, there is a need to prevent diatomaceous earth from being discharged into the environment when backflushing DE pool filters.

BRIEF SUMMARY OF THE INVENTION

The present invention provides its benefits across a broad spectrum of backflushing pool filter systems. Although the present invention is discussed in conjunction with backflushing diatomaceous earth pool filters, it may be used for backflushing any reusable pool filter system. While the description which follows hereinafter is meant to be representative of such applications, it is not exhaustive. As will be understood, the basic apparatus taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

It is one aspect of the present invention to provide a backflush trap that traps contaminants present on the filter when backflushing the filter and prevents the contaminants from being dispersed in the area where the discharge tube is located.

It is another aspect of the present invention to provide a backflush trap that traps diatomaceous earth present on the filter when backflushing and prevents it from being dispersed in the area where the discharge tube is located.

It is still yet another aspect of the present invention to provide an easy and effective way to dispose both contaminants and diatomaceous earth that have been trapped during backflushing.

It is a feature of the present invention that a backflush trap is provided that can be removed from the backflush discharge tube and disposed of with its contents of contaminants and diatomaceous earth.

It is an advantage of the present invention that, when backflushing diatomaceous earth filters, diatomaceous earth is prevented from being expelled and clogging sewer and drainage systems.

These and other aspects, features, and advantages are achieved/attained in the apparatus of the present invention that comprises a pool filter backflush trap that captures diatomaceous earth and contaminants when backflushing a pool filter. The pool filter backflush trap comprises a filter member that allows water to pass through that is delivered from a discharge tube of a pool filter while substantially preventing diatomaceous earth from passing through. In one embodiment the filter member is made from a cotton sateen cloth, but any fabric material that traps particles between a size range of about 30.0 μm and about 40.0 μm with an efficiency of at least about 60% in a clean un-used condition may be used. The filter member is formed from a rectangular piece of sateen cloth with a circular piece sewn in at one end, having a length of about 6 feet and circular diameter of about 4 inches, and provides about 917 square inches of surface area for the filter member. This has been found to provide a sufficient surface area to allow water to pass through the filter at a rate of up to 95 gallons per minute. The shape of the filter member is not critical to the function of the backflush trap as long as its surface area is sufficient to allow water to pass through the filter member at a rate at least equal to the flow rate of the water entering the filter member from the pool pump.

The backflush trap is releasably attached to the discharge tube so that it can be removed and disposed in a waste receptacle. In one embodiment, hook and loop fasteners are provided adjacent the opening of the filter member to releasably attach the backflush trap to the discharge tube. In another embodiment, a cord is sewn into the end of the opening of the filter member that can be tied over the discharge tube. In yet another embodiment, a separate hook and loop strap is used, with a friction pad sewn into the inside opening of the filter member to help prevent the backflush trap from coming off the discharge tube. In yet another embodiment, an elastic O-ring is used that is stretched over the discharge tube and over the opening of the filter member. In yet another embodiment, an elastic band is provided on the opening of the filter member that is stretched over the discharge tube.

BRIEF DESCRIPTION OF THE DRAWINGS

The aspects, features and advantages of the present invention will become apparent upon consideration of the following detailed disclosure of the invention, especially when it is taken in conjunction with the accompanying drawings wherein:

FIG. 1 is a side view of an embodiment of the present invention pool filter backflush trap shown attached to a backflush pool filter in the pool cleaning position.

FIG. 2 is a side view of the embodiment of the present invention shown in FIG. 1 with the backflush pool filter in the backflush position.

FIG. 3 is a exploded isometric view of the embodiment of the backflush trap shown in FIGS. 1-2 as it is releasably attached to a discharge tube of the backflush pool filter.

FIG. 4 is an exploded isometric view of an alternative embodiment of the backflush trap as it is releasably attached to a discharge tube of the backflush pool filter.

FIG. 5 is an exploded isometric view of another alternative embodiment of the backflush trap as it is releasably attached to a discharge tube of the backflush pool filter.

FIG. 6 is an exploded isometric view of yet another alternative embodiment of the backflush trap as it is releasably attached to a discharge tube of the backflush pool filter.

FIG. 7 is an exploded isometric view of still yet another alternative embodiment of the backflush trap as it is releasably attached to a discharge tube of the backflush pool filter.

To facilitate understanding, identical reference numerals have been used, where possible, to designate identical elements or features common to the figures.

DETAILED DESCRIPTION OF THE PREFERRED EMBODIMENTS

Referring to FIGS. 1-2, the present invention pool filter backflush trap is shown generally by number 10 attached to a discharge tube 11 of a backflush pool filter 13. FIG. 1 shows the pool filter 13 and its backflush valve 15 in the pool cleaning position. Water from the pool pump (not shown) is delivered to inlet pipe 17 and into the filter chamber 19 through pipe 21. The water passes through the filter inside the filter chamber 19 and returns to the pool through pipes 23 and 25. While in the pool cleaning position, no water passes through the discharge tube 11.

When it is necessary to backflush the pool filter, backflush valve 15 is opened, as shown in FIG. 2. With the backflush valve 15 opened, water from the pool pump is delivered into inlet pipe 17 and into the filter chamber through pipe 23. This reverses the flow of water through the filter, causing contaminants on the filter to become dislodged. The contaminants and water flow through pipe 21 and out the discharge tube 11. Normally this contaminated discharge is dissipated at ground level. However, according to the present invention, with the pool filter backflush trap 10 releasably attached to the discharge tube 11, the filter member 12 captures the contaminants while allowing water to pass through, as shown by numeral 14. When backflushing is complete, the backflush trap can be quickly and easily removed from the discharge tube 11 and properly disposed of in a waste receptacle.

The filter member is formed from a material sufficiently porous to allow water to pass through while substantially preventing diatomaceous earth from passing through. Preferably, the material is cotton cloth, and a number of cotton cloth fabrics were experimentally used to select one appropriate for use in the backflush trap. A cotton sateen cloth was selected as it produced the necessary characteristics of capturing nearly all diatomaceous earth. This determination was based on a visual inspection after backflushing where no perceptible residue of diatomaceous earth was detected.

Tests were preformed on the cotton sateen cloth to determine its efficiency in capturing diatomaceous earth particles. The first test was to determine the percentage volume of particle sizes present in a sample of diatomaceous earth commercially sold in pool supply centers. The results of the test are shown in Table 1.

TABLE 1

| Particle diameter size range (μm) | Percentage by Volume of particles within the size range |
|---|---|
| 100 μm-70.0 μm | 7.25% |
| 70 μm-50 μm | 21.91% |
| 50 μm-40 μm | 19.68% |
| 40 μm-30 μm | 28.70% |
| 30 μm-20 μm | 19.98% |
| 20 μm-15 μm | 1.94% |
| 15 μm-2.0 μm | 0.54% |

The results in Table 1 demonstrate that about 90% by volume of diatomaceous earth used in pool filter applications have a particle diameter size range of between about 20 μm and 70 μm. Next, a filtration test was conducted to determine the efficiency of the cotton sateen cloth in capturing particle diameter size ranges between 2.0 μm to 100 μm. Particles within the various ranges were delivered in water to the cotton cloth material in a clean and un-used condition, and the concentration of particles upstream of the material (filter) and downstream of the filter were measured. Efficiency for each particle range was determined by the following formula:

$$F_{eff} = (C_{up} - C_{down}) \div C_{up} \times 100\%$$

where:
$F_{eff}$=Efficiency
$C_{up}$=Particle Concentration Upstream of Filter
$C_{down}$=Particle Concentration Upstream of Filter The results of the filtration efficiency test are shown in Table 2.

TABLE 2

| Particle size range | Efficiency $F_{eff}$ |
|---|---|
| 2.0 μm-5.0 μm | 3.9% |
| 5.0 μm-10.0 μm | 14.4% |
| 10.0 μm-20.0 μm | 30.2% |
| 20.0 μm-30.0 μm | 47.3% |
| 30.0 μm-40.0 μm | 75.7% |
| 40.0 μm-60.0 μm | 86.1% |
| 60.0 μm-80.0 μm | 95.0% |
| 80.0 μm-100 μm | 98.9% |

It should be noted that these efficiency measurements were taken with a clean, un-used cloth material. When in actual use, as the material traps more diatomaceous earth, the efficiency of the material increases as the particles start to saturate the pores of the cloth. Since about 90% of the particles are of a size range between 20 μm and 70 μm, and the measured efficiencies for a clean cloth within the particle range between about 30.2% and 90%, the average efficiency within this range is about 60% ((30%+90%)/2). Hence, it is believed that any material for the contaminant trap will be effective in substantially preventing diatomaceous earth from passing through the trap if it can trap particles between a size range of about 30.0 μm and about 40.0 μm with an efficiency of at least about 60% in a clean un-used condition.

As used herein, the term "fabric" means any material that is knit, braided, woven, or netted with any fiber. The fibers may be animal fibers, vegetable fibers, plant fibers, cellulose fibers, or the like. Some common fabrics that may be used are wool, cotton, silk, linen, hemp, ramie, and jute. Paper fibers from cellulose pulp may be used as well. In addition, the fibers may be man made, such acetate, acrylic, lastex, nylon, polyester, or rayon. Whatever fabric material is used, it should trap particles between a size range of about 30.0 µm and about 40.0 µm with an efficiency of at least about 60% in a clean un-used condition.

The pool filter backflush trap 10 shown in FIGS. 1-2 is formed from a rectangular piece of cotton sateen cloth with a circular piece 16 sewn at the end to form a tubular structure. Alternatively, the circular piece 16 could be omitted, if desired, and the end could be sewn shut. Generally, a length of about 6 feet with a circular diameter of about 4 inches provides sufficient surface area (917 square inches) for the cotton sateen cloth to allow water to pass through the filter member at a rate at least equal to the flow rate of the water entering the filter member from the discharge tube 11 for nearly any pool application. Typically, pool pumps generally deliver between about 35 to 95 gallons of water per minute (gpm), and with the sateen cloth selected having a surface area of about 917 square inches, the water is able to pass through the filter member at the same rate as the flow rate of the pump. As those skilled in the art will appreciate, the amount of surface area necessary will depend on the material selected for the filter member as well as the flow rate of the pool pump for a given application. Thus, the surface area necessary for a particular backflush trap may vary depending on the application. In addition, the shape of the trap 10 need not be tubular, but may take any shape desired, such as a generally flat cylinder, cube, or the like. As understood by those skilled in the art, the shape is not critical to the function of the backflush trap, but rather that the filter member have sufficient surface area to allow water to pass through the filter member at a rate at least equal the flow rate of the water entering the filter member.

In FIGS. 1-3, the backflush trap 10 is releasably attached to the discharge tube 11 via hook and loop fasteners 16 adjacent the opening of the filter member 12, the opening generally identified by numeral 18. The hook and loop fasteners 16 can be VELCRO® brand hook and loop fasteners, or the like. Referring particularly to FIG. 3, the hook and loop fasteners 16 are sewn directly to the end of the filter member 12 adjacent the opening 18. To attach the backflush trap 10 to the discharge tube 11, the opening 18 of the filter member 12 is inserted over the discharge tube 11, and the hook and loop fasteners 16 snugly attached to one another, as seen in FIGS. 1 and 2. After backflushing, the hook and loop fasteners 16 can be quickly detached, and the backflush trap 10 can be advantageously disposed of in a waste receptacle.

An alternative means for releasably securing the opening 18 of the filter member 12 to the backflush discharge tube 11 is shown in FIG. 4. In this embodiment, a cord 20 is sewn into the end of the opening 18 of the filter member 12. To attach the backflush trap 10 to the discharge tube, the cord 20 is drawn tight and tied, as desired, around the discharge tube. After backflushing, the cord 20 can be un-tied and the backflush trap 10 disposed of accordingly.

Another alternative means for releasably securing the opening 18 of the filter member 12 to the backflush discharge tube 11 is shown in FIG. 5. In this embodiment, the hook and loop fasteners 16 reside on a strap 22 which is not attached to the filter member 12. The strap is attached over the filter member 12 after the opening 18 is inserted over the discharge tube 11. In this embodiment, a friction pad 24 is sewn to the inside of the filter member 12 near the opening to provide a more secure connection between the backflush trap 10 and the discharge tube. The friction pad is formed from a polyester textile coated with polymer sold under the name Slipnot™ by Leggett & Platt, Vantage Ind., Atlanta, Ga. This material is generally sold as friction matt used in kitchen cabinets. Additionally, shown in FIG. 5, is a coupling 27 attached to the end of the discharge tube 11 that assists in maintaining the connection between the backflush trap 10 and the discharge tube 11.

Another alternative means for releasably securing the opening 18 of the filter member 12 to the backflush discharge tube 11 is shown in FIG. 6. In this embodiment, an elastic O-ring 22 is stretched over the discharge tube 11, and then the opening 18 of the filter member 12 is inserted over the discharge tube 11. Once the filter member 12 is in place, the O-ring is rolled over the end of the filter member 12. In this embodiment, the elasticity of the O-ring provides the necessary binding force to hold the backflush trap 10 on the discharge tube 11. Although not required, but shown in FIG. 6, the friction pad 24 further assists the O-ring in connecting the backflush trap 10 to the discharge tube 11. After backflushing, the O-ring 22 can be rolled back to release the backflush trap 10, and the O-ring can be left on the discharge tube 11, if desired, for use the next time the pool filter needs to be backflushed.

Another alternative means for releasably securing the opening 18 of the filter member 12 to the backflush discharge tube 11 is shown in FIG. 7. In this embodiment, an elastic band is attached to the opening 18 of the filter member 12. The elastic band is stretched over the discharge tube 11 to secure the backflush trap to the discharge tube 11. Shown in FIG. 7, coupling 27 is attached to the discharge tube 11, which provides a rim for the elastic band to engage over and thereby secure the backflush trap 10 to the discharge tube 11.

It is to be appreciated that the backflush trap can be releasably secured to the discharge tube by any number of means known to those skilled in the art, such as with buttons, snap fittings, or the like.

What has been described are preferred embodiments of a pool filter backflush trap in which modifications and changes may be made without departing from the spirit and scope of the accompanying claims. Although only certain embodiments have been described above in detail, those skilled in the art will appreciate that numerous modification are possible without materially departing from the novel teachings and advantages of the subject matter described herein. For example, although the filter member is shown having a tubular shape it can be any shape desired, such as spiral shaped, star shaped, or the like, as long as the surface area is sufficient to allow water to pass through the filter at a rate at least equal to the rate it is delivered from the discharge tube of the pool filter. Accordingly, these and all other such modifications are intended to be included within the scope of the present invention. Other modifications, substitutions, changes, and omissions may be made in the design, operating conditions, and arrangement of the preferred and other exemplary embodiments without departing from the spirit of the present invention.

What is claimed is:

1. A pool filter backflush trap for capturing contaminants of a dirty pool filter, the backflush trap comprising:

a filter member formed from a material sufficiently porous to allow water to pass through while substantially preventing diatomaceous earth from passing through, the filter member having an opening for receiving water and contaminants from a backflush discharge tube of a pool filter, the porous filter member forming an enclosure about the backflush discharge tube, the enclosure having a surface area of sufficient size to allow water to pass through the filter member at a flow rate at least equal to the flow rate of the water entering the opening from the backflush discharge tube of the pool filter; and, means for releasably securing the opening of the filter member to the backflush discharge tube.

2. The pool filter backflush trap of claim 1 wherein the filter member is formed from a material that captures particles between a size range of about 30.0 μm and 40.0 μm with an efficiency of at least about 60%.

3. A pool filter backflush trap of claim 2 wherein the material of the filter member is a fabric.

4. A pool filter backflush trap of claim 3 wherein the fabric is made from fibers selected from the group consisting of cellulose fibers, animal fibers, vegetable fibers, and plant fibers.

5. A pool filter backflush trap of claim 3 wherein the fabric is made from synthetic fibers selected from the group consisting of acetate, acrylic, lastex, nylon, polyester, and rayon.

6. A pool filter backflush trap of claim 3 wherein the means for releasably securing the opening of the filter member to the backflush discharge tube comprises:

a hook and loop fastener attached to the filter member adjacent the opening, the opening of the filter member being inserted over the backflush discharge tube and the hook and loop fastener being strapped together over the backflush discharge tube to secure the backflush trap to the discharge tube.

7. A pool filter backflush trap of claim 3 wherein the means for releasably securing the opening of the filter member to the backflush discharge tube comprises:

an elastic O-ring, the opening of the filter member inserted over the discharge tube and the O-ring inserted over the opening of the filter member and the discharge tube to secure the backflush trap to the discharge tube.

8. A pool filter backflush trap of claim 3 wherein the means for releasably securing the opening of the filter member to the backflush discharge tube comprises:

an elastic band attached to the opening of the filter member, the elastic strap being stretched over the discharge tube to secure the backflush trap to the discharge tube.

9. A pool filter backflush trap of claim 3 wherein the means for releasably securing the opening of the filter member to the backflush discharge tube comprises:

a cord attached to the opening of the filter member, the cord being securely tied over the discharge tube to secure the backflush trap to the discharge tube.

10. A pool filter backflush trap of claim 3 wherein the means for releasably securing the opening of the filter member to the backflush discharge tube comprises:

a hook and loop strap, the opening of the filter member being inserted over the backflush discharge tube and the hook and loop strap being strapped over the filter member and the backflush discharge tube to secure the backflush trap to the discharge tube.

11. A pool filter backflush trap of claim 3 wherein the means for releasably securing the opening of the filter member to the backflush discharge tube comprises:

a cord, the opening of the filter member being inserted over the backflush discharge tube and the cord being tied over the filter member and the backflush discharge tube to secure the backflush trap to the discharge tube.

12. A pool filter backflush trap of claim 3 further comprising:

a friction pad attached inside the opening of the filter member, the friction pad engaging the outer surface of the discharge tube.

* * * * *